United States Patent
Mortun

(10) Patent No.: US 10,199,814 B2
(45) Date of Patent: Feb. 5, 2019

(54) OUTDOOR WEATHER RESISTANT OUTLET COVER

(71) Applicant: Hubbell Incorporated, Shelton, CT (US)

(72) Inventor: Sorin Mortun, Irvington, NY (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/663,011

(22) Filed: Jul. 28, 2017

(65) Prior Publication Data

US 2018/0034253 A1 Feb. 1, 2018

Related U.S. Application Data

(60) Provisional application No. 62/367,936, filed on Jul. 28, 2016.

(51) Int. Cl.
| | |
|---|---|
| *H02G 3/08* | (2006.01) |
| *H02G 3/14* | (2006.01) |
| *H01R 13/52* | (2006.01) |

(52) U.S. Cl.
CPC ......... *H02G 3/081* (2013.01); *H01R 13/5213* (2013.01); *H02G 3/088* (2013.01); *H02G 3/14* (2013.01)

(58) Field of Classification Search
CPC ........ H02G 3/081; H02G 3/14; H02G 3/1088; H02G 3/088
USPC ....................................................... 174/50
See application file for complete search history.

(56) References Cited

U.S. PATENT DOCUMENTS

| | | |
|---|---|---|
| 6,806,426 B1 | 10/2004 | Gretz |
| 7,554,037 B1 | 6/2009 | Shotey et al. |
| 7,598,453 B1 * | 10/2009 | Shotey ............... H02G 3/14 174/66 |
| 8,017,865 B1 | 9/2011 | Baldwin |
| 8,053,671 B1 * | 11/2011 | Shotey ............... H02G 3/14 174/481 |
| 8,389,858 B2 | 3/2013 | Drane |
| 8,569,621 B1 * | 10/2013 | Shotey ............... H02G 3/14 174/481 |
| 8,633,385 B2 | 1/2014 | Korcz et al. |

(Continued)

OTHER PUBLICATIONS

PCT/US2017/044397 International Search Report and Written Opinion dated Dec. 4, 2017 (15 pages).

*Primary Examiner* — Dhirubhai R Patel
(74) *Attorney, Agent, or Firm* — Michael Best & Friedrich, LLP

(57) ABSTRACT

An in-use outlet cover includes a base configured to be positioned over an electrical receptacle. The base having a recessed portion at least partially defining a chamber configured to receive a plug to connect a load to the outlet. A cover assembly is pivotally connected to the base. An expandable member can positioned in a central opening of the base and moveable between a first position where the expandable member has a first volume and a second position where the expandable member has a second volume greater than the first volume, and wherein movement of the expandable member varies the size of the chamber. The cover assembly can additionally or alternatively include a lower cover pivotally connected to the base and an upper cover pivotally connected to the lower cover.

20 Claims, 8 Drawing Sheets

(56) References Cited

U.S. PATENT DOCUMENTS

| | | | |
|---|---|---|---|
| 9,007,773 B2 * | 4/2015 | Warren | H05K 5/0013 |
| | | | 165/80.2 |
| 9,099,854 B2 | 8/2015 | Shotey et al. | |
| 2004/0067691 A1 * | 4/2004 | Vicenza | B60R 16/0238 |
| | | | 439/620.27 |
| 2010/0051313 A1 | 3/2010 | Dinh et al. | |

* cited by examiner

OUTDOOR WEATHER RESISTANT OUTLET COVER

FIELD

Various exemplary embodiments of the invention relate to weather resistant outlet covers.

BACKGROUND

Electrical outlets may be exposed to rain, snow, debris, and other contaminants when mounted in outdoor locations, such as exterior walls. In such locations, the electrical outlet can be protected with a cover that can be closed while a plug is plugged into the outlet. Such outlet covers are called while-in-use covers. Typical while-in-use covers include a base surrounding an outlet and a cover connected to and extending from the base. A plug can be inserted into the outlet and the cover has an interior dimension sufficient to allow the cover to be closed while the plug is inserted. A cord can extend through an opening in the cover.

In-use covers conventionally fall two categories—bubble covers and flush mount covers. Bubble covers are generally used where the sockets for the outlet are mounted near the outer surface of the wall. The outlet is covered by an in-use cover by providing a cover that creates a bubble around the cords plugged into the outlet. Flush mount covers are generally used where the sockets for the outlet are mounted recessed into the wall with the cover closing against the wall. The outlet is covered by an in-use cover by the spacing between the cover and the sockets allowing for a plug to be plugged into the socket while the cover is closed.

SUMMARY

According to an exemplary embodiment, an in-use outlet cover includes a base configured to be positioned over an electrical receptacle. The base having a recessed portion at least partially defining a chamber configured to receive a plug to connect a load to the outlet. A cover assembly is pivotally connected to the base and includes a central opening. An expandable member is positioned in the central opening and moveable between a first position where the expandable member has a first volume and a second position where the expandable member has a second volume greater than the first volume, and wherein movement of the expandable member varies the size of the chamber.

According to another exemplary embodiment, an in-use outlet cover includes a base configured to be positioned over an electrical receptacle. The base has a substantially rectangular configuration with first and second short sides and first and second long sides. A lower cover includes a substantially rectangular configuration with first and second short sides and first and second long sides. The first short side of the lower cover is pivotally connected to the first short side of the base. An upper cover has a substantially rectangular configuration with first and second short sides and first and second long sides. The first long side of the upper cover is pivotally connected to the first long side of the lower cover.

According to another exemplary embodiment, an in-use outlet cover includes a base configured to be positioned over an electrical receptacle. The base has a substantially rectangular configuration with first and second short sides and first and second long sides. A lower cover has a substantially rectangular configuration with first and second short sides and first and second long sides. The first short side of the lower cover is pivotally connected to the first short side of the base. An upper cover has a substantially rectangular configuration with first and second short sides and first and second long sides. The first long side of the upper cover is pivotally connected to the first long side of the lower cover. An expandable member is connected to the upper cover and has an outer wall and a collapsible side wall. The expandable member is moveable between a first position where the outer wall is positioned a first distance from the upper cover and a second position a second distance from the upper cover, wherein the second distance is greater than the first distance.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
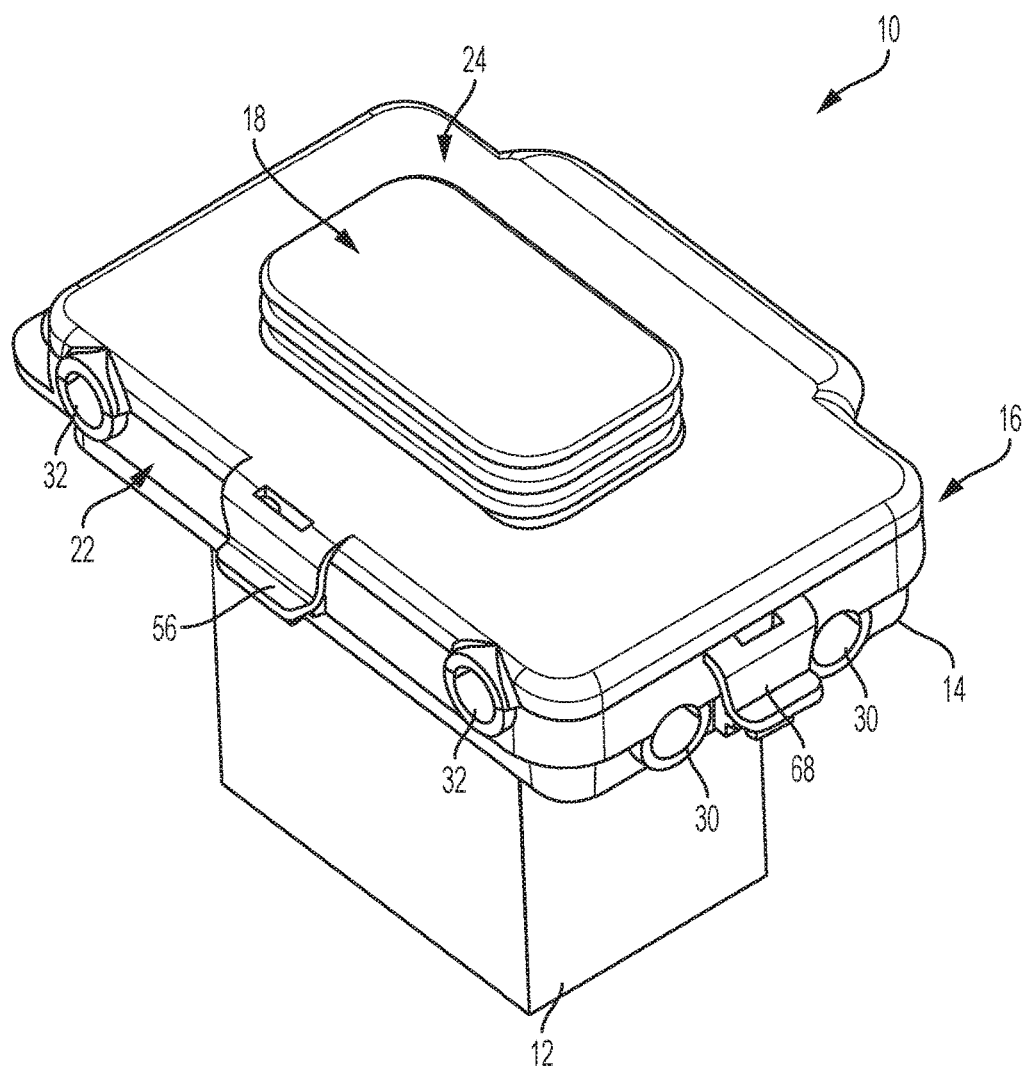
FIG. 1 is a perspective view of an outlet housing and outlet cover.
Figure 2:
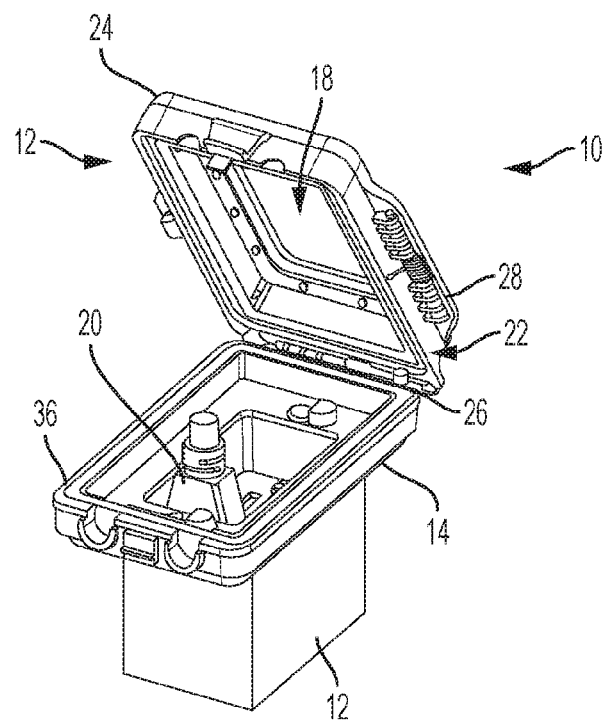
FIG. 2 is a perspective view of FIG. 1 with the outlet cover opened in a first direction.
Figure 3:
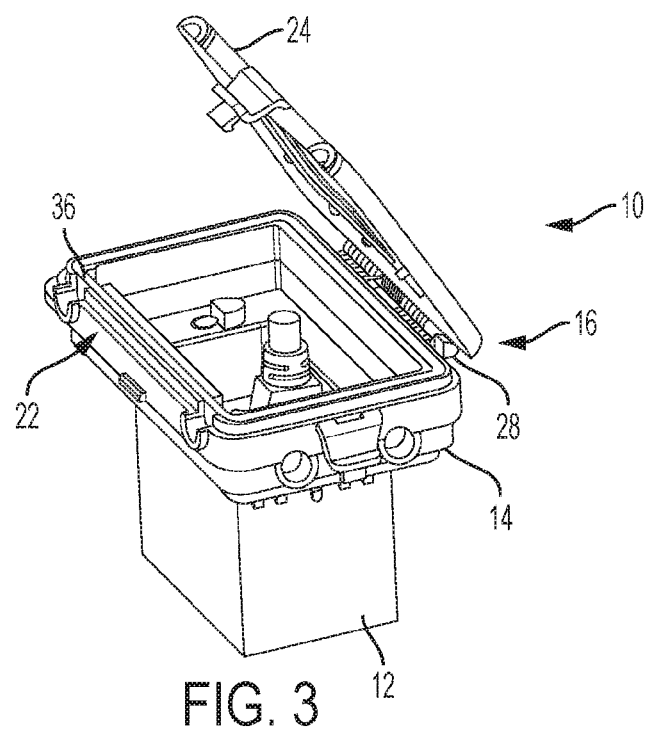
FIG. 3 is a perspective view of FIG. 1 with the outlet cover opened in a second direction.

FIGS. 1-3 show an exemplary embodiment of a while-in-use electrical outlet cover 10 connected to an outlet housing 12. The outlet cover 10 includes a base 14, a cover assembly 16, and an expandable member 18. The cover assembly 16 can be oriented either horizontally or vertically and pivoted about a first axis along a short side of the cover and a second axis along a long side of the cover, as shown in FIGS. 2 and 3. The cover assembly 16 is a low profile cover so that it does not extend from the outlet a sufficient distance to permit a standard plug 20 to be inserted and the cover 10 closed.

To permit the outlet to be used while the cover 10 is closed, the expandable member 18 moves between a first, or collapsed, position where the expandable member is positioned near an outer surface of the cover assembly 16 and a second, or extended, position where the expandable member 18 is spaced from the outer surface of the cover assembly 16. Accordingly, the expandable member 18 has a first volume in the collapsed position and a second, larger volume in the extended position.

Figure 4:
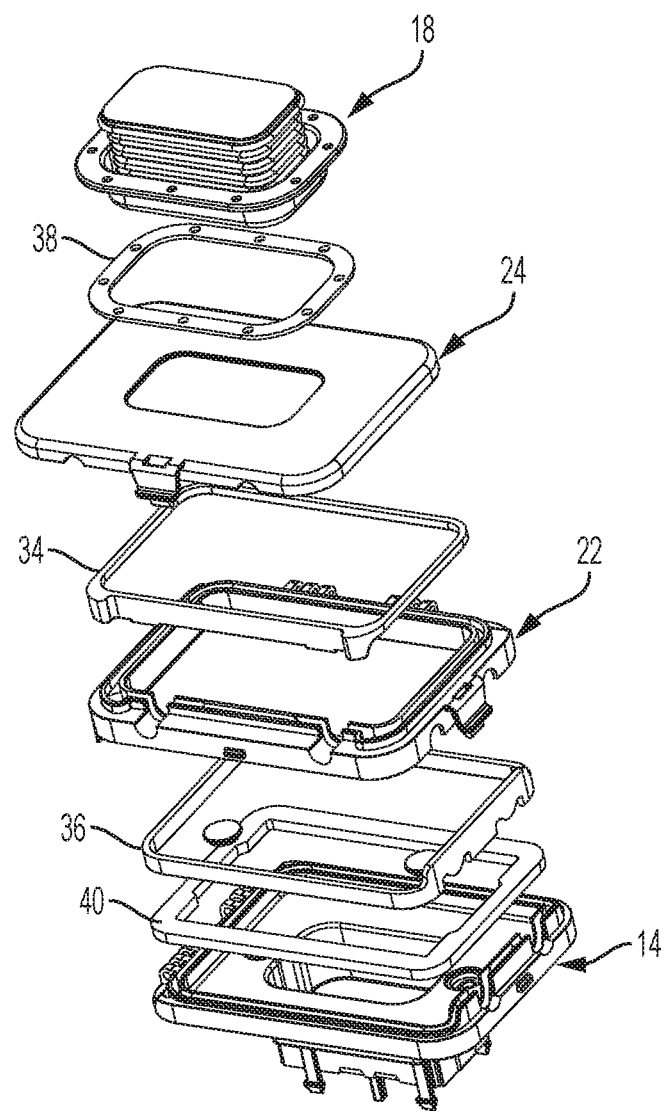
FIG. 4 is an exploded view of the outlet cover of FIG. 1.
Figure 5:
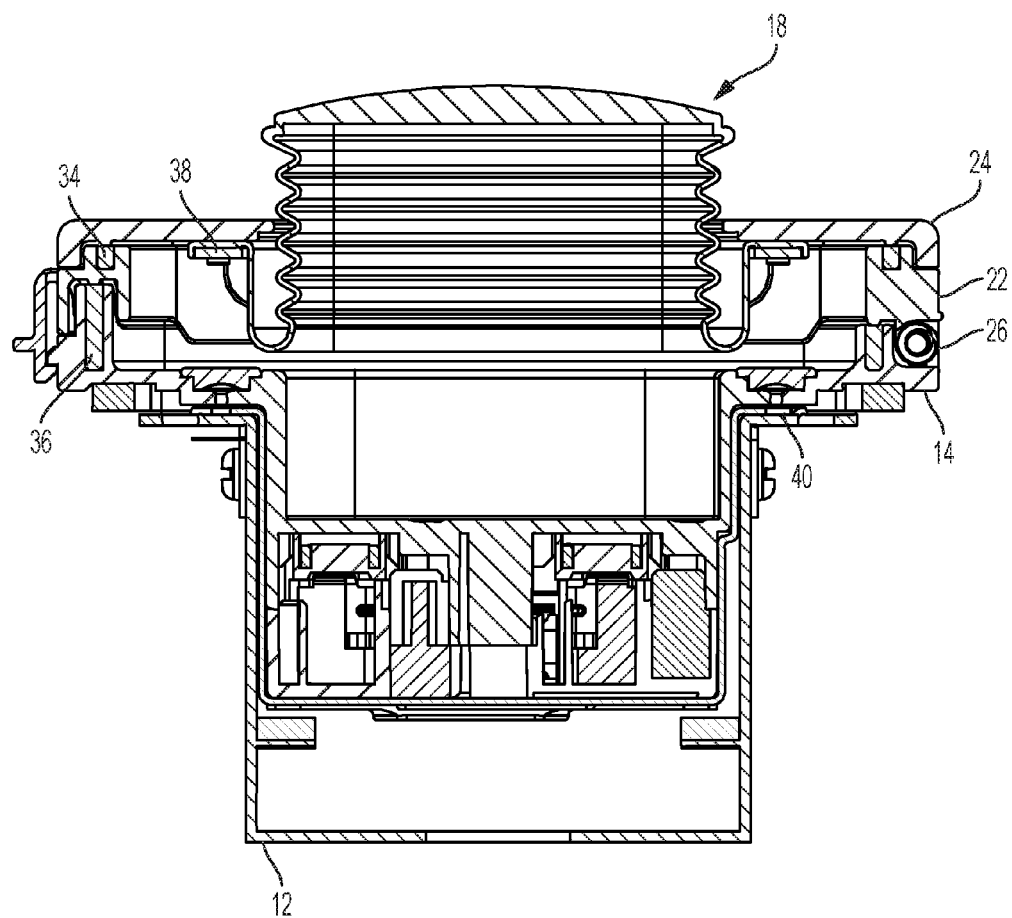
FIG. 5 is a sectional view of the outlet cover of FIG. 1.

FIGS. 4 and 5 show an exemplary embodiment of the outlet cover 10 in more detail. The cover assembly 16 includes a lower cover 22 pivotally connected to the base 14 and an upper cover 24 pivotally connected to the lower cover 22. The expandable member 18 extends through an opening in the upper cover 24. A first hinge member 26 pivotally connects the lower cover 22 to the base 14 and a second hinge member 28 pivotally connects the upper cover 24 to the lower cover 22. The base 14 and cover assembly 16 are shown having a substantially rectangular configuration with a pair of long sides and a pair of short sides, although other configurations can be used depending on the type of outlet and outlet housing.

One or more openings are provided for cords to extend through the outlet cover 10. For example, a first set of openings 30 is at least partially defined by apertures in the base 14 and the lower cover 22 along the short side and a second set of openings 32 is at least partially defined by apertures in the lower cover 22 and the upper cover 24 along the long side, as best shown in FIGS. 1-3. A seal or gasket can be provided between one or more of the components, as best shown in FIGS. 4 and 5. A first seal 34 is positioned between the upper cover 24 and lower cover 22 to provide water resistance to the first set of openings 30 and any cords extending therethrough. A second seal 36 is positioned between the lower cover 22 and the base 14 to provide water resistance to the second set of openings 32 and any cords extending therethrough. The first and second seals 34, 36 are sized to cover the openings 34, 36 when no cord is present and be compressible around a cord to seal any open space between the cord and the openings 34, 36. A first gasket 38 can be provided between the expandable member 18 and the upper cover 24 and a second gasket 40 can be provided between the base 14 and the outlet housing 12.

Figure 6:
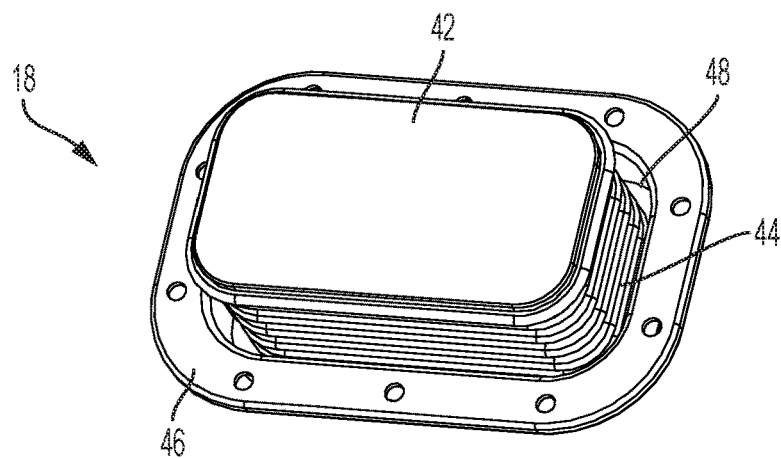
FIG. 6 is a top perspective view of the expandable member.
Figure 7:
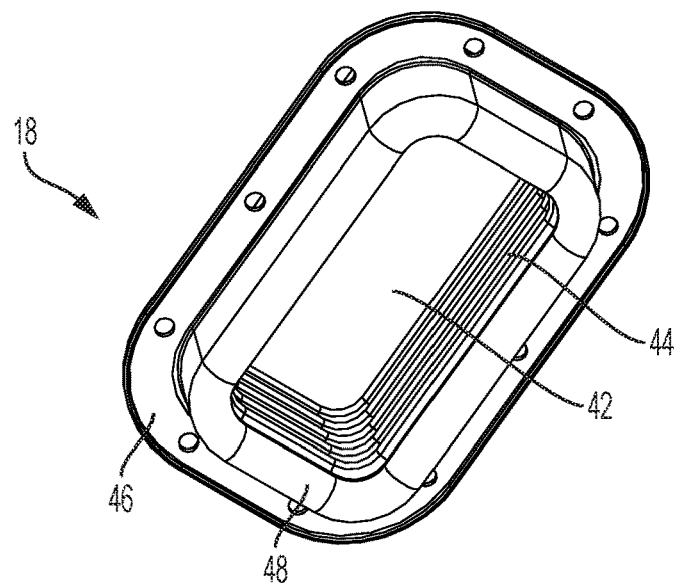
FIG. 7 is a bottom perspective view of FIG. 6.

As best shown in FIGS. 6 and 7, the expandable member 18 includes an outer wall 42, a moveable or collapsible portion 44, a flange 46, and a recessed portion 48. The moveable portion 44 can include a flexible, corrugated material allowing the outer wall to move between an expanded position and a collapsed position. The flange 46 includes a series of openings to receive fasteners. In an exemplary embodiment, at least a portion of the expandable member 48 can also be transparent, allowing a user to see inside of the outlet cover 10. The outer wall 42, moveable portion 44, flange 46, and recessed portion 48 can all be transparent, or any combination of components can be transparent.

Figure 8:
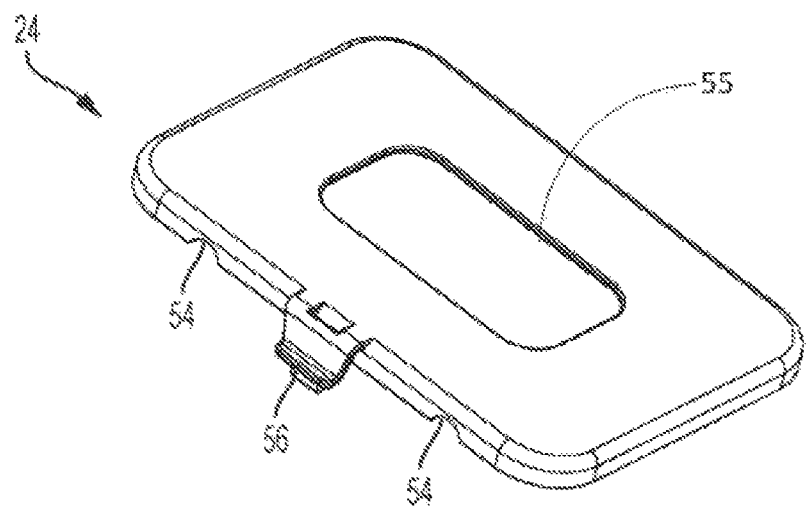
FIG. 8 is a top perspective view of the expandable member.
Figure 9:
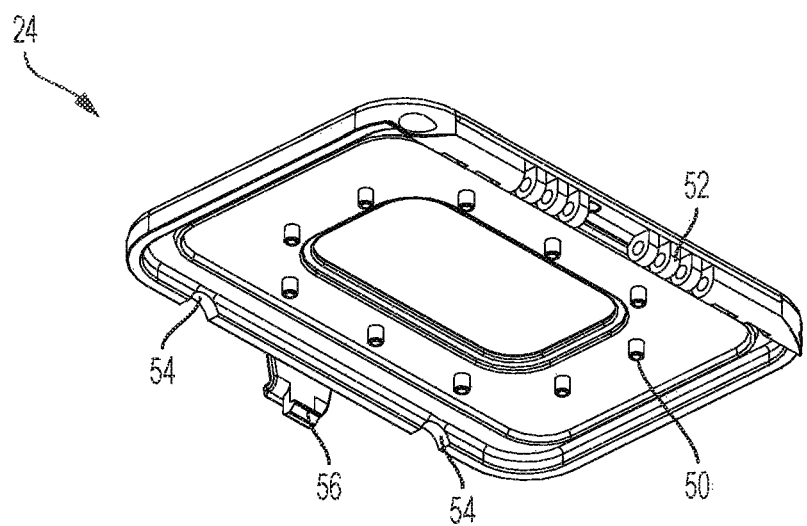
FIG. 9 is a bottom perspective view of FIG. 8.

FIGS. 8 and 9 show an exemplary embodiment of the upper cover 24. The upper cover 24 has a substantially rectangular configuration with a pair of long sides and a pair of short sides. An opening in the upper cover 24 receives the expandable member 18. A series of bosses 50 extend from a lower surface of the upper cover 24. The bosses 50 can align or extend into the openings in the expandable member flange 46. The upper cover 24 includes a first hinge portion 52 on one of the long sides and a set of apertures 54 and a latch 56 are positioned on the opposite long side.

Figure 10:
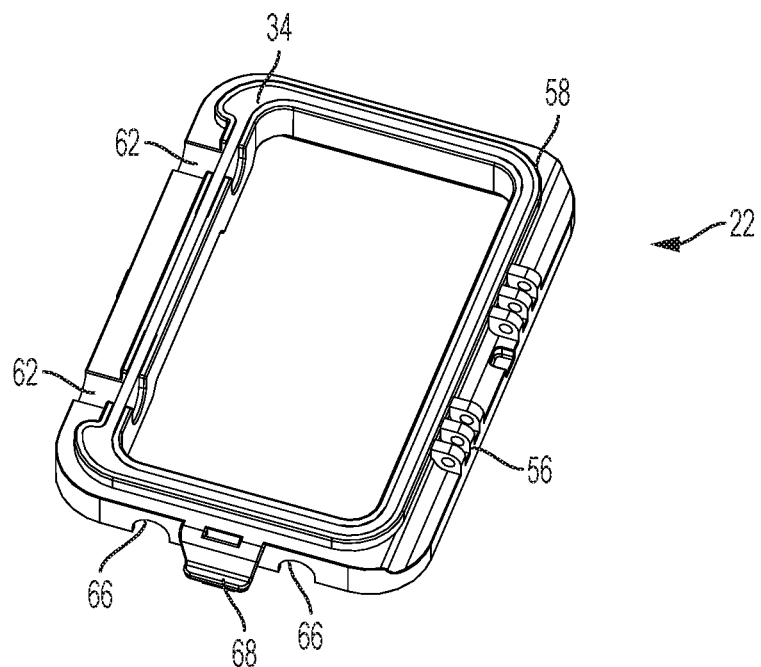
FIG. 10 is a top perspective view of the lower cover.
Figure 11:
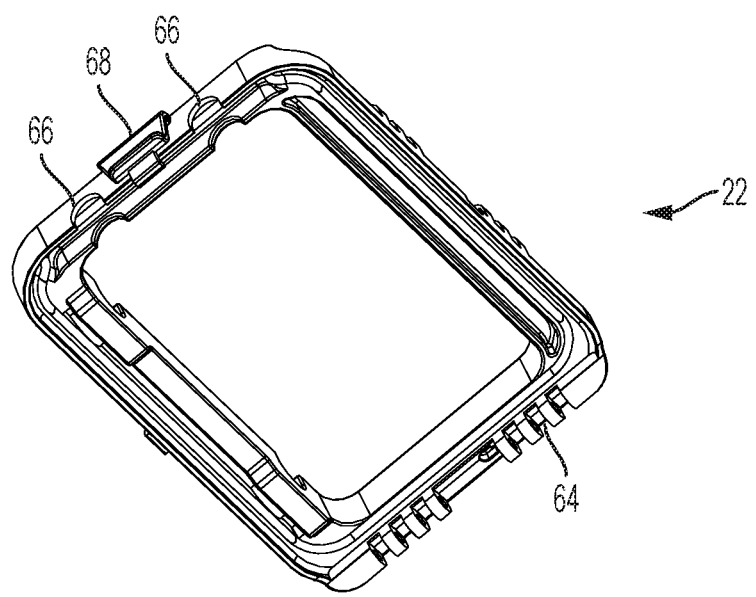
FIG. 11 is a bottom perspective view of FIG. 10.

FIGS. 10 and 11 show an exemplary embodiment of the lower cover 22. The lower cover 22 has a substantially rectangular configuration with a pair of long sides and a pair of short sides surrounding a central opening. A channel 58 extends around the lower cover 22 defined by an outer side wall and an inner side wall to receive the first seal 34. The lower cover 22 includes a first hinge portion 60 on one of the long sides and a first set of apertures 62 are positioned on the opposite long side. The first hinge 60 portion mates with the upper cover first hinge portion 52 and the first set of apertures 62 are aligned with the upper cover apertures 54. The lower cover 22 also includes a second hinge portion 64 on one of the short sides and a second set of apertures 66 and a latch 68 positioned on the opposite short side.

Figure 12:
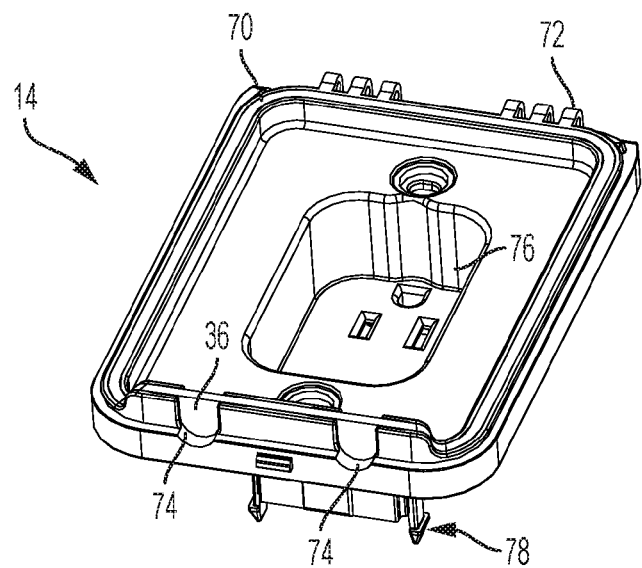
FIG. 12 is a top perspective view of the base.
Figure 13:
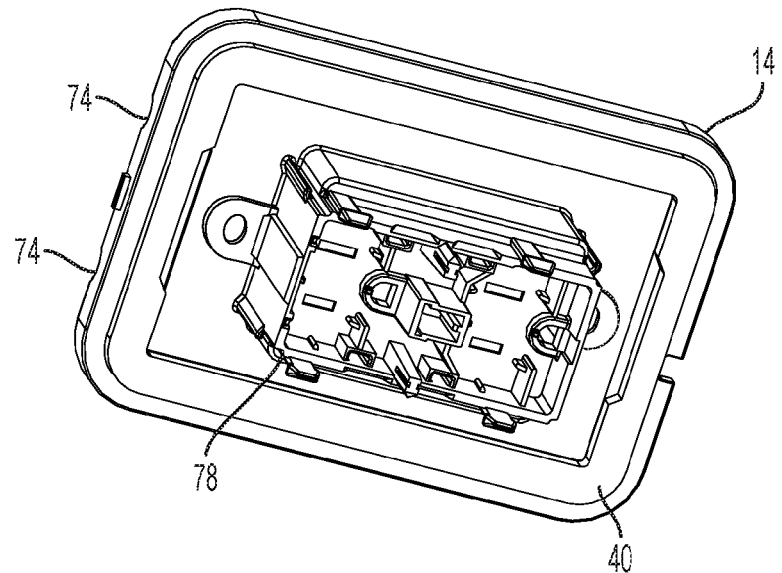
FIG. 13 is a bottom perspective view of FIG. 12.

FIGS. 11 and 12 show an exemplary embodiment of the base 14. The base 14 has a substantially rectangular configuration with a pair of long sides and a pair of short sides surrounding a central opening. A channel 70 extends around the base 14 defined by an outer side wall and an inner side wall to receive the second seal 36. The base 14 includes a first hinge portion 72 on one of the short sides and a first set of apertures 74 are positioned on the opposite short side. The first hinge portion 72 mates with the lower cover second hinge portion 64 and the first set of apertures 74 are aligned with the lower cover second set of apertures 66.

The base 14 includes a recessed portion 76 configured to receive one or more plugs. The exemplary embodiment shows a lower wall of the recessed portion 76 having dual, three-prong receptacle openings, although other embodiments can utilize different outlet openings as would be understood by one of ordinary skill in the art. The base 14 has a bottom portion 78 that is configured to snap-fit to a portion of an electric receptacle although other configurations can be used. The second gasket 40 is positioned on the bottom of the base 14 to help form a seal between the base and an outlet housing.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. An in-use outlet cover comprising:
  a base configured to be positioned over an electrical receptacle, the base having a recessed portion at least partially defining a chamber configured to receive a plug to connect a load to the outlet;
  a cover assembly pivotally connected to the base and having a central opening; and
  an expandable member positioned in the central opening and moveable between a first position where the expandable member has a first volume and a second position where the expandable member has a second volume greater than the first volume, and wherein movement of the expandable member varies the size of the chamber,
  wherein the expandable member includes an outer wall, a collapsible portion, a flange, and a recessed portion positioned between the flange and the collapsible portion.

2. The in-use outlet cover of claim 1, wherein the collapsible member includes a flexible side wall.

3. The in-use outlet cover of claim 2, wherein the side wall is corrugated.

4. The in-use outlet cover of claim 1, wherein the flange includes a set of openings and wherein the cover assembly includes a set of bosses configured to engage the openings.

5. The in-use cover of claim 1, wherein the expandable member is at least partially transparent.

6. The in-use outlet cover of claim 1, wherein the cover assembly includes a lower cover pivotally connected to the base and an upper cover pivotally connected to the lower cover.

7. The in-use outlet cover of claim 1, wherein the cover assembly is configured to pivot about a first axis along a long side of the cover assembly and about a second axis along a short side of the cover assembly.

8. An in-use outlet cover comprising:
   a base configured to be positioned over an electrical receptacle, the base having a substantially rectangular configuration with first and second short sides and first and second long sides;
   a lower cover having a substantially rectangular configuration with first and second short sides and first and second long sides, wherein a first hinge pivotally connects the first short side of the lower cover to the first short side of the base; and
   an upper cover having a substantially rectangular configuration with first and second short sides and first and second long sides, wherein a second hinge pivotally connects the first long side of the upper cover to the first long side of the lower cover.

9. The in-use outlet cover of claim 8, wherein a first cord opening is defined by a first aperture in the second long side of the upper cover and a second aperture in the second long side of the lower cover and a second cord opening is defined by a third aperture in the second short side of the lower cover and a fourth aperture in the second short side of the base.

10. The in-use outlet cover of claim 9, wherein a first seal is provided to seal the first cord opening and a second seal is provided to seal the second cord opening.

11. The in-use outlet cover of claim 10, wherein the first seal is positioned in a channel in the lower cover and the second seal is positioned in a channel in the base.

12. The in-use outlet cover of claim 8, wherein the base includes a connection member configured to connect the base to the receptacle.

13. The in-use outlet cover of claim 12, wherein the connection member includes a snap-fit connection feature.

14. The in-use outlet cover of claim 8, wherein the upper cover includes a central opening and an expandable member positioned in the central opening and moveable between a first positioned where the expandable member has a first volume and a second positioned where the expandable member has a second volume greater than the first volume.

15. An in-use outlet cover comprising:
   a base configured to be positioned over an electrical receptacle, the base having a substantially rectangular configuration with first and second short sides and first and second long sides;
   a lower cover having a substantially rectangular configuration with first and second short sides and first and second long sides, the first short side of the lower cover pivotally connected to the first short side of the base;
   an upper cover having a substantially rectangular configuration with first and second short sides and first and second long sides, the first long side of the upper cover pivotally connected to the first long side of the lower cover; and
   an expandable member connected to the upper cover and having an outer wall and a collapsible side wall, the expandable member moveable between a first position where the outer wall is positioned a first distance from the upper cover and a second position a second distance from the upper cover, wherein the second distance is greater than the first distance.

16. The in-use outlet cover of claim 15, wherein a first cord opening is defined by a first aperture in the second long side of the upper cover and a second aperture in the second long side of the lower cover and a second cord opening is defined by a third aperture in the second short side of the lower cover and a fourth aperture in the second short side of the base.

17. The in-use outlet cover of claim 15, wherein the base is snap-fit to the receptacle and the base includes a lower wall having a set of receptacle openings.

18. The in-use outlet cover of claim 15, further comprising a first latch configured to secure the lower cover to the base and a second latch configured to secure the upper cover to the lower cover.

19. The in-use outlet cover of claim 15, wherein the expandable member includes a flange having a set of openings and wherein the upper cover includes a set of bosses configured to engage the openings.

20. The in-use outlet cover of claim 15, wherein the expandable member includes a flexible, corrugated side wall.

* * * * *